(No Model.)
F. E. BRINER.
ELECTRIC MOTOR.
No. 605,850.
2 Sheets—Sheet 2.
Patented June 21, 1898.
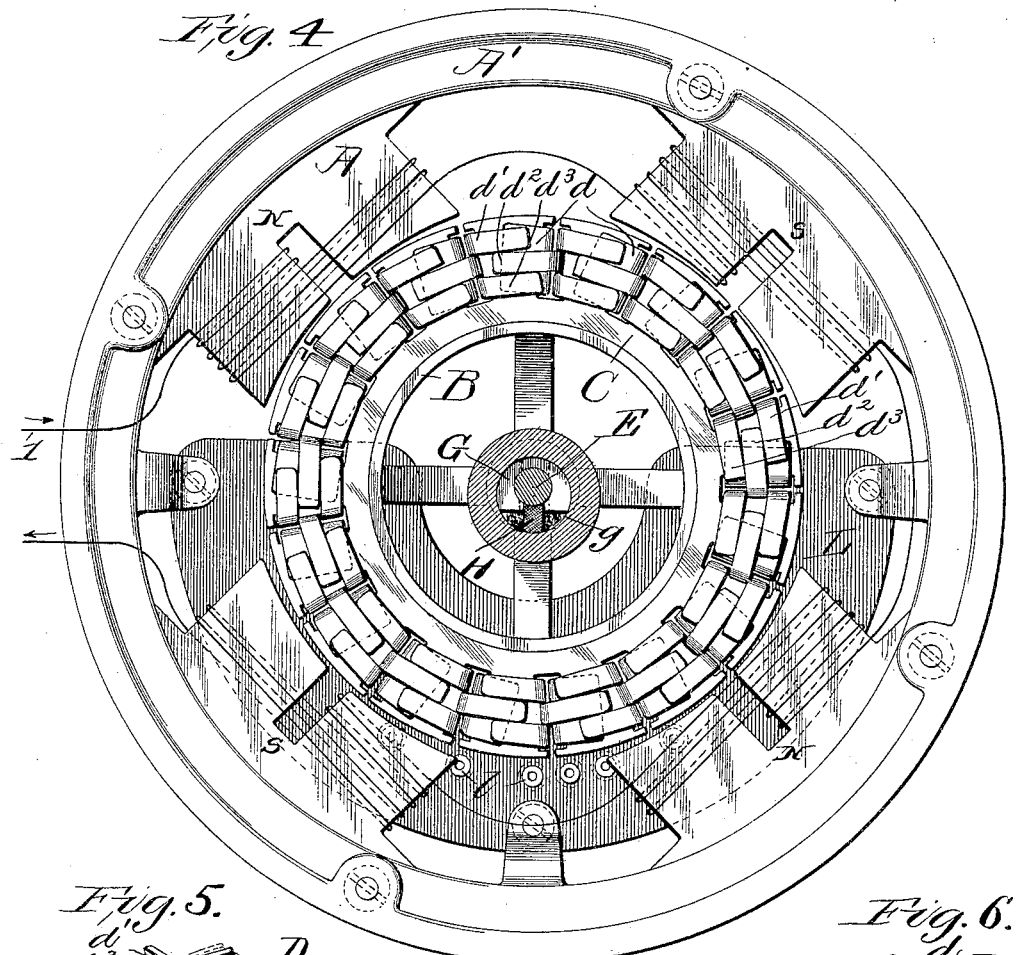
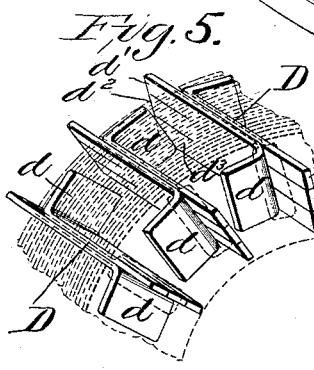
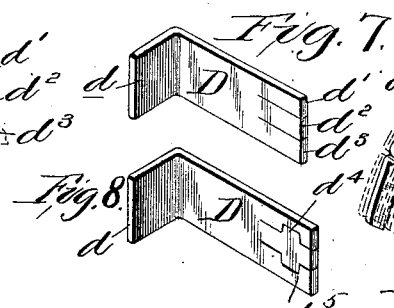
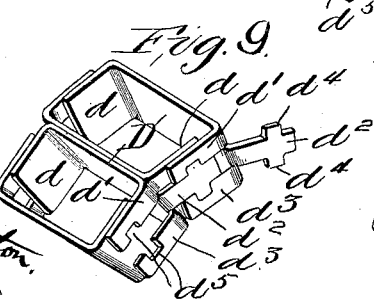
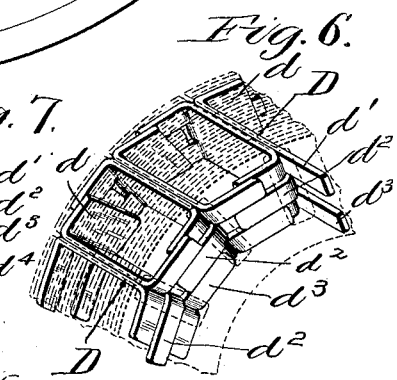
Attest:
G. A. Pennington
Ralph Kalish
Inventor
F. E. Briner
by Bakewell & Cornwall
Attys.
THE NORRIS PETERS CO., PHOTO-LITHO., WASHINGTON, D. C.

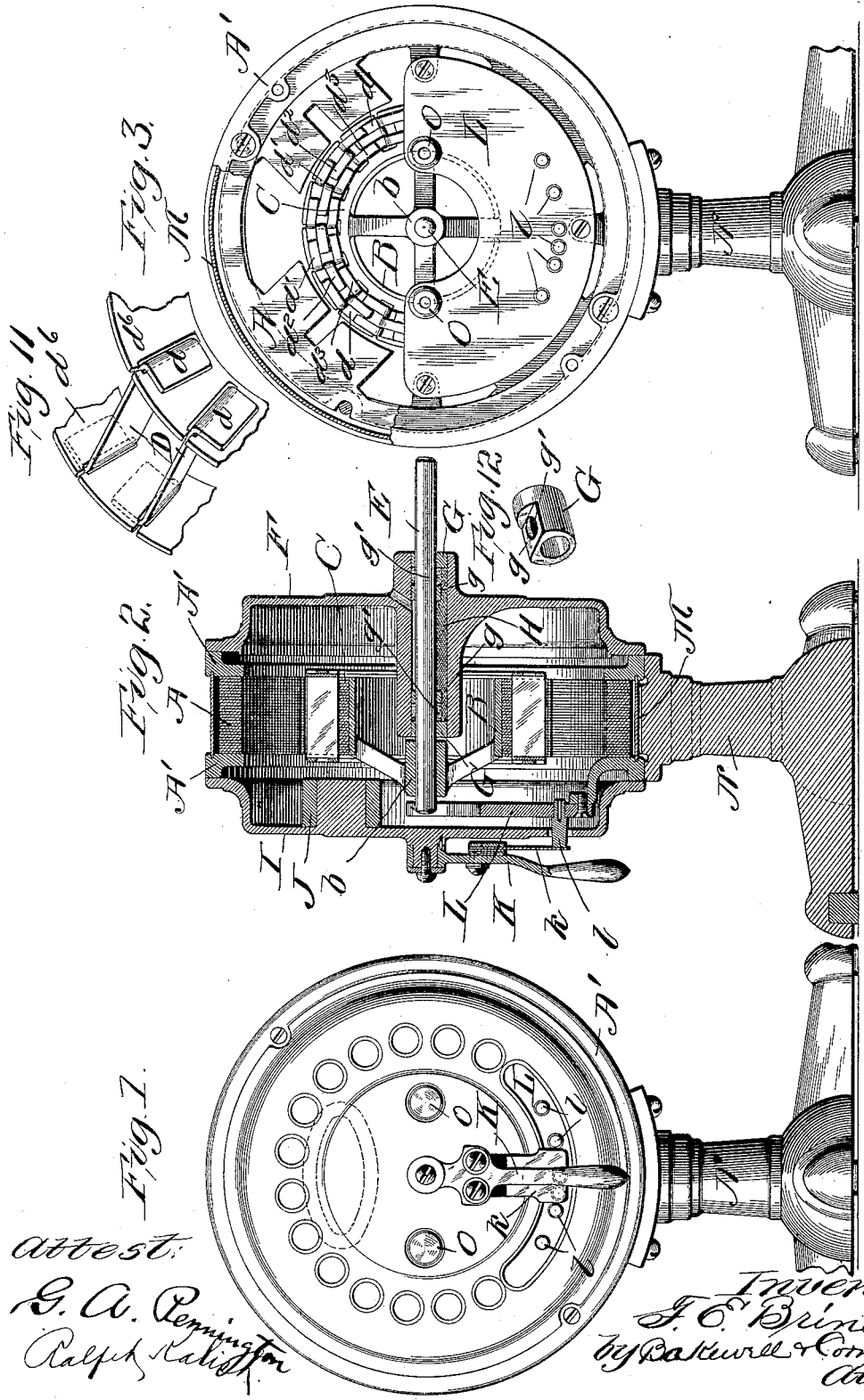

UNITED STATES PATENT OFFICE.

FREDERICK E. BRINER, OF ST. LOUIS, MISSOURI, ASSIGNOR TO THE EMERSON ELECTRIC MANUFACTURING COMPANY, OF SAME PLACE.

ELECTRIC MOTOR.

SPECIFICATION forming part of Letters Patent No. 605,850, dated June 21, 1898.

Application filed August 21, 1897. Serial No. 649,004. (No model.)

*To all whom it may concern:*

Be it known that I, FREDERICK E. BRINER, a citizen of the United States, residing at the city of St. Louis, State of Missouri, have invented a certain new and useful Improvement in Electric Motors, of which the following is a full, clear, and exact description, such as will enable others skilled in the art to which it appertains to make and use the same, reference being had to the accompanying drawings, forming part of this specification, in which—

Like letters and figures of reference refer to corresponding parts.

This invention relates to a new and useful improvement in electric motors, and more particularly to that class of electric motors known as "induction-motors," in which the armature is influenced by a moving magnetic field, said armature being provided with short-circuiting induced-current-conducting bars.

The object of this invention is to construct a motor of the character described which will be simple, cheap, efficient, and powerful.

In the accompanying drawings, forming part of this specification, Figure 1 is a rear elevational view of my improved motor. Fig. 2 is a sectional view therethrough. Fig. 3 is an end elevational view, the back plate being removed to more clearly show the interior. Fig. 4 is an enlarged view, the front plate being removed to more clearly show the interior. Fig. 5 is a detailed view illustrating the manner of assembling the induced-current-conducting bars in the armature. Fig. 6 is a similar view showing the manner of bending the ends of said induced-current-conducting bars to make contact with each other and short circuit of the same. Fig. 7 is a detached view of one of said induced-current-conducting bars. Fig. 8 is a detached view of one of said induced-current-conducting bars, illustrating a slightly-modified form. Fig. 9 is a detailed view showing the manner of assembling the induced-current-conducting bars illustrated in Fig. 8. Fig. 10 is a fragmentary view of one of the laminations of the armature, showing the openings for the induced-current-conducting bars, said laminations being sawed through the periphery to sever the poles. Fig. 11 illustrates a slightly-modified form of induced-current-conducting bars, and Fig. 12 is a detailed view of one of the bearings for the armature-shaft.

The features of this present invention reside in the special form of winding for the field-magnets, the construction of the armature and induced-current-conducting bars in said armature, the manner of mounting the armature on its shaft, and the bearings for said armature-shaft, and in the details of construction, combination, and arrangement of the several parts, all as will hereinafter be described and afterward pointed out in the claims.

In the drawings, A indicates the laminations forming the core of the field-magnet, shown in the drawings as being formed with four divided polar projections; but it is obvious that more polar projections can be employed, if desired. These laminations are clamped between two end plates A'.

The winding of the field-magnets is shown more clearly in Fig. 4, in which 1 indicates the feed-wire passing around the first division or half of a polar projection and then around both divisions or the entire polar projection in the same direction, as shown. The wire then continues to pass around the first half of the next polar projection in an opposite direction, after which it passes around the entire polar projection in the same opposite direction. The wire then is wound around the next polar projection in the same direction and in the same manner as the winding of the first polar projection, after which it is wound on the next or fourth polar projection in the same manner and in the same direction as on the second polar projection. This makes alternating north and south poles in the field. It is understood that alternating currents are used in a motor of this character. It will be noticed that I do not use a starting-coil or a different winding to start the motor. The winding shown is continuous and in use at all times. I have found by experiment that the magnetic poles have a different magnetic intensity at different portions thereof. This will answer admirably for motors of this description. The first half of each polar projection having so much more winding than the other or second half of the polar projection will become more thoroughly saturated with magnetism than the second half, and for this reason I obtain a result equal to a lagging in the phase of the current.

B indicates a spider-frame for supporting the armature, the hub portion $b$ of said frame being offset, as shown more clearly in Fig. 2, so as to cause the armature to overhang.

C indicates the laminations comprising the core of the armature, said laminations being formed with a series of openings $c$, as shown in Fig. 10. In forming these laminations a bridge is left for each opening at the periphery of the lamination, and after the induced-current-conducting bars are inserted these bridges are sawed in half, so as to sever the polar projections of the armature.

D indicates an induced-current-conducting bar which when inserted in an armature-opening is substantially of the shape shown in Fig. 7, wherein one end $d$ is bent down at an angle while the other end is split, forming tongues $d'$, $d^2$, and $d^3$. These induced-current-conducting bars are introduced from opposite sides of the armature-core, as shown in Fig. 5, wherein it will be seen that the bent portion $d$ lies against the outer laminations, and the tongues project beyond the outer lamination on the other side, two of these induced-current-conducting bars being introduced into a single opening. After the induced-current-conducting bars are in position in the armature the tongues are bent down over the portions $d$, as shown in Fig. 6—that is, the tongue $d'$ is bent over and mashed down upon the bent portion $d$ on the induced-current-conducting bar in an adjacent opening, the tongue $d^2$ is bent down over the portion $d$ on the companion induced-current-conducting bar in the same opening, and the tongue $d^3$ is bent down over the portion $d$ on the induced-current-conducting bar in the adjacent opening similar to the tongue $d'$. These tongues match each other over the bent portions and form contacts whose surface area is in excess of the cross-sectional area of two companion induced-current-conducting bars in a single opening. This is a very desirable feature. After the tongues have been bent down, as shown, the induced-current-conducting bars will contact with each other, and the armature is then dipped in a weak solution of muriatic acid, after which it is immersed in solder.

In Figs. 8 and 9 I have shown a slightly-modified form of tongues on the induced-current-conducting bars, in which the central tongue is provided with lateral wings $d^4$, interlocking with recesses $d^5$ of the two outside tongues of an adjacent induced-current-conducting bar.

In the making of armatures for motors of this description it has been the practice heretofore to arrange rings at the sides of the armature-core and pass round copper bars through the core, riveting the same to the copper rings. These riveted heads on the bars give way under expansion of the armature-core, the result being that the copper rings become loose and unserviceable. Moreover, the proper contact is not made between the short-circuiting rings of copper and the induced-current-conducting bars. By my construction the induced-current-conducting bars form the proper contact, and by being bent, matched, and interlocked with each other it is impossible for them to work loose or give way under expansion of the laminations of the armature-core. Again, where round induced-current-conducting bars are used there is not enough iron left between the parts, due to the circularity of the openings through which they must pass. By making the openings in the core radially elongated I am enabled to leave a larger body of iron between the openings to accommodate the same amount of copper, and so obtain better results by having a more efficient armature.

In Fig. 11 I have shown two copper rings $d^6$, being the short-circuiting rings of the armature, the induced-current-conducting bars being bent over said rings at their ends.

E indicates the armature-shaft, through which the hub $b$ of the armature-spider is fixed. This armature-shaft is mounted in bearings arranged in the front plate F of the armature-casing, said front plate being preferably secured to the clamping-rings of the field-magnet core. As shown in Fig. 2, this bearing is somewhat elongated, and the opening in the hub of the front plate is eccentrically arranged relative to said plate. In each end of this hub I introduce two bushings G, whose construction is more clearly shown in Fig. 12. These bushings have a recessed portion $g$ on their under sides nearest each other, an opening $g'$ being formed into which a fibrous lubricator may be introduced.

H indicates a fibrous lubricator arranged beneath the shaft in the hub of the front plate. After the bushings have been placed in position and secured firmly in place the opening for the shaft is bored axially correct relative to the field-magnet. In this manner I get oil-space for a lubricator and am enabled to carry a sufficient quantity of oil to lubricate the armature for a considerable length of time.

I indicates the back plate of the motor, which may, if desired, carry a resistance-coil J; but this forms no part of my present invention.

K indicates a switch-handle pivotally mounted on a projecting frame on back plate I, said switch-handle carrying switch-blades $k$, coöperating with suitable contact-points $l$, mounted in an insulation-piece L, secured to lugs projecting from the rear clamping-blade of the field-magnet.

M indicates a casing introduced between clamping-rings of the field-magnet to give a finished appearance to the motor.

N indicates the base, preferably in the form of a tripod and provided with a standard for supporting the motor.

The armature-shaft extends some distance forward beyond the front plate, so as to enable the mounting of a fan, pulley, or gear-wheel, as desired.

O indicates two binding-posts for the wires, said binding-posts being preferably mounted in the insulation-piece L.

I am aware that many minor changes in the arrangement, construction, and combination of the several parts of my machine can be made and substituted for those herein shown and described without in the least departing from the nature and principle of my invention.

Having thus described my invention, what I claim, and desire to secure by Letters Patent, is—

1. In an induction-motor, the combination with a field-core formed with divided polar projections, a winding on said polar projections, which winding preponderates on one of the halves of each of said polar projections, the windings on alternate polar projections being in opposite directions, and an armature comprising a laminated core and induced-current-conducting bars whose ends are bent one upon the other, to form a continuous conductor at the ends of the armature, for short-circuiting said bars, substantially as described.

2. In an induction-motor, the combination with divided polar projections, of a winding thereon which embraces a portion of a polar projection, and then the entire polar projection, said winding being wound in opposite directions on alternate polar projections, an armature comprising a laminated core with transverse grooves in its periphery, and induced-current-conducting bars which are arranged in each of said transverse grooves the ends of said induced-current-conducting bars in adjacent grooves being bent one upon the other to form an unbroken contact through the ends of said bars at each side of the armature, for short-circuiting the currents induced in said bars, substantially as described.

3. The herein-described armature for induction-motors, the same comprising a laminated core formed with transverse grooves in its periphery, and induced-current-conducting bars arranged in said grooves and having their ends bent so as to form a continuous short-circuiting band at each side of armature, for said induced-current-conducting bars, substantially as described.

4. The herein-described armature for induction-motors, the same comprising a laminated core provided with suitable seats at, or near, its periphery for the reception of induced-current-conducting bars, and induced-current-conducting bars arranged in said seats, one end of said bars being formed with a bent portion $d$, and the other end of said bars being provided with tongues $d'$, $d^2$, and $d^3$, to coöperate with each other and the bent portions $d$ of adjacent bars, substantially as described.

5. The herein-described armature for induction-motors, the same comprising an elongated core, and induced-current-conducting bars whose ends are bent one upon the other, said ends interlocking with each other; substantially as described.

6. The herein-described armature for induction-motors, the same comprising a laminated core formed with grooves in its periphery, the mouths of which grooves are contracted, and induced-current-conducting bars D which are inserted endwise through said grooves below their mouths, a solid end $d$ of said induced-current-conducting bars being bent upon the armature in one direction on one side thereof, and in an opposite direction on the other side thereof, and tongues $d'$, $d^2$, and $d^3$ on said induced-current-conducting bars which are bent on each side of the armature, to coöperate with their companions and with the solid bent portions $d$ of adjacent induced-current-conducting bars, substantially as described.

7. The herein-described armature for induction-motors, the same comprising a core formed with radially-elongated openings, and two companion induced-current-conducting bars which are inserted through the said openings, the ends of said bars terminating a short distance beyond the core where they are bent in opposite directions, the bars in adjacent openings being bent, one upon the other; substantially as described.

8. The herein-described armature for induction-motors, the same comprising an elongated core and induced-current-conducting bars which are inserted through radially-elongated openings in the said core from opposite sides and bent one upon the other, said bars being formed with a bent portion $d$ on one end and tongues $d'$, $d^2$, and $d^3$ on the other end; substantially as described.

9. The herein-described armature for induction-motors, the same comprising an elongated core formed with openings for the induced-current-conducting bars, and induced-current-conducting bars which are inserted through said openings from opposite sides in pairs, said current-conducting bars being formed with a bent portion $d$ at one end, and tongues $d'$, $d^2$, and $d^3$ at its other end, the tongue $d^2$ being provided with lateral wings $d^4$, and tongues $d'$ and $d^3$ being provided with recesses $d^5$ on their under edges for receiving the wings $d^4$ of adjacent tongues; substantially as described.

10. In an electric motor, the combination with the armature and its shaft, a frame-plate formed with eccentric openings for said shaft, and bearings introduced in said eccentric openings for the armature-shaft, said bearings being bored axially correct; substantially as described.

11. In an electric motor, the combination with a frame-plate provided with a hub having an eccentric opening, of bushings arranged in the ends of said hub and bored so as to be axially correct, and an armature-shaft mounted in said bushings; substantially as described.

12. In an electric motor, the combination with a frame-plate provided with an elongated hub having an eccentric opening formed through it, of bearings having recesses formed on their under sides, said bearings being bored axially correct for the armature-shaft, and an armature-shaft; substantially as described.

In testimony whereof I hereunto affix my signature, in the presence of two witnesses, this 18th day of August, 1897.

FREDERICK E. BRINER.

Witnesses:
   HUGH K. WAGNER,
   F. R. CORNWALL.